Patented Sept. 3, 1935

2,013,076

UNITED STATES PATENT OFFICE 2,013,076

ORGANIC COLORING MATERIAL COMPRISING AN AZO COMPOUND AND CHLORINATED ROSIN AS A SUBSTRATUM

Alfred Siegel, Hillside, N. J., assignor to Krebs Pigment & Color Corporation, Newark, N. J., a corporation of Delaware No Drawing. Application October 16, 1933, Serial No. 693,824

6 Claims. (Cl. 134—58.5)

The present invention comprises novel azo lakes and pigments in which the azo coloring compound is associated with a substratum comprising a chlorinated rosin and processess of making the same.

The chlorinated rosins useful in my invention are the products obtained by chlorination of sodium abietate as described for instance, in German Patent 514,151. Similar products are obtained by the action of chlorine upon a solution of rosin in a chloroform-carbon tetrachloride mixture. According to the method of manufacture the products contain up to 4 chlorine atoms in the abietic acid molecule. The chlorinated rosins form water soluble alkali metal soaps, their salts with alkaline earth and heavy metals are substantially water insoluble. The chlorinated rosins have a higher softening point than the initial material, are soluble in alcohol, benzol, terpentine, etc. and are physically distinguished from rosin by their insolubility in petroleum ether.

I have, jointly with E. R. Allen shown in U. S. Patent Re. 18,590 that the development of azo lakes and pigments in the presence of metallic rosinates produces novel lakes, etc. containing the metallic rosinate as the substratum and that these novel products are distinguished by valuable tinctorial properties.

I have found that the chlorinated rosins can also act as substrata for azo lakes and pigments when the development of the lake is effected in the presence of a chlorinated rosin compound.

The process of my invention comprises, therefore, developing by heating an aqueous suspension of an insoluble azo coloring compound or salt in the presence of an insoluble salt of a chlorinated rosin.

By the term development I refer to that step of the process of making lakes or pigments in which an insoluble azo coloring compound is heated in aqueous suspension with a substratum. During this operation some physical and chemical changes take place, the azo compound combines with the substratum and the full tinctorial value of the pigment is obtained.

The suspension of the azo coloring compound and the chlorinated rosin as used in my invention can be obtained in any desired manner.

I can, for instance, add a soluble chlorinated rosin soap to either of the components which by coupling produce the azo compound. By addition of an alkaline earth or heavy metal salt to the above reaction mixture, I precipitate the insoluble azo compound and the insoluble chlorinated rosin salt. This suspension can then be heated to effect development, or I can separate the mixture of the two insoluble compounds from their mother liquor, make a fresh aqueous slurry therefrom and add, if desired, an alkali and/or a dispersing agent and then heat the slurry to effect development. I can also separately prepare the azo compound and then add the chlorinated rosin and jointly precipitate their insoluble compound whereby a suspension adapted for development is obtained, or I can separately prepare the insoluble salts of the azo compound and the chlorinated rosin and mix them into an aqueous slurry ready for development. The aqueous slurry can also be prepared in any other manner as will be obvious to those skilled in the art.

The insoluble salts of the chloro-rosins as used in the development of my lakes and pigments are prepared by the action of alkaline earth metal and heavy metal salts upon the more or less soluble alkali metal salts of the chlorinated rosins. Calcium, barium, aluminum, zinc salts, etc. are preferred for this purpose. Similarly when using salt-forming azo compounds I use their insoluble alkaline earth and heavy metal salts.

The development can be carried out in neutral or alkaline solution with similar results though in many instances an alkaline development is preferred. In many instances the presence of a dispersing agent in the development suspension is preferred and I found that soaps, sulfonated vegetable and animal oils, such as Turkey red oil, sulfonated castor oil, sulfonated rapeseed oil, sulfonated cottonseed oil, sulfonated fish oil are particularly adapted to act as dispersing agent in the development of lakes and pigments from azo coloring compounds and chlorinated rosins.

My invention is applicable to various azo-dyestuffs of the following three types which are capable of being transformed into pigments.

*Mono-azo monosulfonic acids.*—The sulfonic acid group is usually and preferably located in the first, or diazo component. These toners are more or less soluble in the form of their free acids or alkali metal salts and are rendered insoluble by treatment with an alkaline earth or heavy metal salt. Instances of such combinations are the compounds formed by coupling 1. Diazotized 2-naphthylamine 1-sulfonic acid with beta naphthol (Lithol red, Colour Index No. 189).

2. Diazotized para-nitraniline ortho-sulfonic acid with beta naphtol (Lake red P, Colour Index No. 158).

3. Diazotized 2-naphthylamine 1-sulfonic acid with salicylic acid.

4. Diazotized para-toluidine metasulfonic acid with the anilide of beta oxynaphthoic acid.

*Mono-azo monocarboxylic acids.*—The carboxylic acid group may be in either component and the component not containing the carboxylic group may or may not contain a sulfonic acid group. These toners are more or less soluble as their free acids or alkali metal salts and are rendered insoluble by treatment with an alkaline earth or heavy metal salt. For example, such toners can be formed by coupling 1. Diazotized para-toluidine metasulfonic acid with beta oxynaphthoic acid (Lithol rubine, Colour Index No. 163).

2. Diazotized para-nitro ortho-toluidine with beta oxynaphthoic acid.

3. Diazotized anthranilic acid with beta naphthol (Lake red D, Colour Index No. 214).

4. Diazotized 2-naphthylamine 1-sulfonic acid with beta oxynaphthoic acid (Lake bordeaux B, Colour Index No. 190).

*Azo pigment dyestuffs.*—This type of toner is a substantially insoluble dyestuff produced in the coupling itself and does not contain salt-forming groups. The following illustrative cases are formed by coupling 1. Diazotized para-nitro-aniline with beta naphthol (Para red, Colour Index No. 44).

2. Diazotized meta-nitro para-toluidine with aceto-acetanilide (Hansa yellow G).

3. Diazotized para-nitro ortho-toluidine with beta naphthol (Pigment orange R, Colour Index No. 68).

4. Diazotized alpha-naphthylamine with beta naphthol (Autol red RL, Colour Index No. 82).

The term oxy-naphthoic acid is used commonly in this art as an abbreviation for the more scientific name 2.hydroxy-naphthalene-3.carboxylic acid and I wish it to be understood that I use it herein exclusively in this sense.

For the purpose of this invention and in accordance with commercial practice, a "toner" is defined as an organic pigment which may or may not contain salt-forming groups and which is not associated with a substratum or extender; and a "lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc. or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine metasulfonic acid with beta oxynaphthoic acid may be used as such (toner form) or may be extended with a substratum consisting of alumina hydrate and blanc fixe (lake form). For use as a rubber pigment it has been found that the lake form has definite advantages over the toner in respect to (a) greater strength for the same dyestuff content, (b) reduction of the tendency to crock, and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap Para reds (so-called Grinder's reds) a substratum is an aid in the grinding of the paint. In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplication in the manufacture of the ink.

The present invention relates to the lakes which contain a substratum, and they can be obtained from the toner type of azo compounds as well as from the azo compounds which only by association with a substratum become a pigment, or lake, in both instances the azo compound is substantially water insoluble before developing or becomes so during development.

The products of the present invention combine to a certain extent the color strength and properties of a toner with the properties usually found in a lake formed with an inorganic substratum.

The amount of chlorinated rosin incorporated as a substratum in my novel lakes and pigments is not of particular significance. From amounts of about 5% on there is a remarkable improvement in the tinctorial properties of the pigment, particularly in the clearness and brightness of the tone; while substantial amounts of the chlorinated rosin substratum do not greatly affect the strength of the lakes and pigments, excessively large amounts of the substratum will weaken the strength and the amount of chlorinated rosin to be used for my novel products will depend on the desired color strength.

My novel azo lakes and pigments are characterized chemically by containing as the substratum a chlorinated rosin compound. They have a brighter and cleaner shade than similar azo lakes and pigments made with inorganic substrata.

The following are a few examples of how I prepared novel lakes and pigments according to my invention.

It will be understood that my invention is not limited to these examples or to the individual manipulation steps described therein. Similar results are also obtained with other azo compounds which are capable of forming lakes and pigments by development in the presence of a substratum and similar results are also obtained by using in the development other alkaline earth and heavy metal salts of the azo compound and the chlorinated rosin.

*Example I.*—A solution of the sodium salt of 2-naphthylamine 1-sulfonic acid corresponding to 111.5 parts of the free acid, is diazotized in the usual manner with 39 parts of sodium nitrite and 204 parts of muriatic acid 20° Bé. In a separate container a solution of 80 parts of beta naphthol and 51 parts of caustic soda is prepared and made to a volume corresponding to approximately 2500 parts of water. After the temperature of this solution has been adjusted to 25° C., the diazo suspension referred to above, is introduced into the beta naphthol solution. The coupling proceeds rapidly and to good completion. It is evident from the amounts of ingredients stated above, that the azo reaction is completed in an alkaline condition. The charge is then heated to 40° C.

To a solution of 30 parts of caustic soda in 325 parts of water is added 75 parts of chlorinated rosin. The volume is then brought to the equivalent of approximately 1900 parts of water, the preparation boiled to complete the saponification. This preparation of chlorinated rosin soap is then run into the charge of the azo dyestuff, described above, and the temperature and volume of the combining solutions so adjusted that the temperature of the resulting charge does not drop below 40° C.

The charge is then precipitated with a solution of 240 parts of barium chloride in 5,000 parts of water at the boil, boiled to insure development of the lake, and the product then washed, filtered, dried and ground in the usual manner.

The yield is approximately 285 parts of dry product compared to 245 parts in a charge prepared without chlorinated rosin soap, the difference representing the chlorinated rosin substratum contained in the lake.

The product has a bright, clean shade.

*Example II.*—A solution of 41.8 parts of the sodium salt of para-toluidine metasulfonic acid ($CH_3:SO_3:NH_2=1:3:4$) is diazotized with 14.4 parts of nitrite of soda and 52 parts of 20° Bé. muriatic acid.

40 parts of beta oxynaphthoic acid ($OH:COOH=2:3$) are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of water at 40° C. To this are added 9.6 parts of para soap in 50 parts of water. In a separate container 32 parts of chlorinated rosin are added to a solution of 6.5 parts of caustic soda in 400 parts of water, and the solution boiled until the formation of the soluble chlorinated rosin soap is complete. This chlorinated rosin soap solution is then added to the dye solution and the temperature adjusted to 40° C. and stirred 40 minutes.

In a separate container 80 parts of calcium chloride are dissolved in 2000 parts of water and the temperature adjusted to 27° C., and into this is then run in 10 minutes the dye soap solution. There is then added 41 parts of caustic soda in 500 parts of water and the slurry stirred for 15 minutes. The charge is then heated to the boil and digested at this temperature for ½ hour, after which it is washed, filtered and dried in the usual manner. The yield is approximately 116 parts of pigment compared with 92 parts in a charge carried out in exactly the same way but without the chlorinated rosin.

The product is a lake giving clean and bright shades.

I claim:

1. In a process of preparing azo lakes and pigments the step of developing an aqueous suspension of an azo coloring compound in the presence of an insoluble salt of a chlorinated rosin.

2. In a process of preparing azo lakes and pigments the step of developing by heating an alkaline, aqueous suspension of an insoluble azo coloring compound and an insoluble salt of a chlorinated rosin.

3. A lake or pigment comprising an azo coloring compound combined with a substratum comprising an insoluble salt of a chlorinated rosin.

4. A lake or pigment comprising a water insoluble azo coloring compound combined with a substratum comprising a water insoluble salt of a chlorinated rosin.

5. A lake or pigment comprising an alkaline earth metal salt of the azo compound obtained by coupling diazotized 2-naphthylamine 1-sulphonic acid with beta naphthol combined with a substantial amount of a substratum comprising an alkaline earth metal salt of a chlorinated rosin.

6. A lake or pigment comprising an alkaline earth metal salt of the azo compound obtained by coupling diazotized para-toluidine metasulfonic acid with beta oxynaphthoic acid, combined with a substratum comprising an alkaline earth metal salt of a chlorinated rosin.

ALFRED SIEGEL.